No. 647,180. Patented Apr. 10, 1900.
H. FELDMEIER.
CENTRIFUGAL MILK TESTER.
(Application filed Oct. 18, 1899.)
(No Model.) 2 Sheets—Sheet 1.

Witnesses:
E. A. Volk.
F. F. Schuzinger.

Harvey Feldmeier, Inventor.
By Wilhelm Bonner,
Attorneys.

No. 647,180. Patented Apr. 10, 1900.
H. FELDMEIER.
CENTRIFUGAL MILK TESTER.
(Application filed Oct. 18, 1899.)
(No Model.) 2 Sheets—Sheet 2.

Witnesses:
E. A. Volk
F. F. Schuzinger

Harvey Feldmeier Inventor.
By Wilhelm Bonner
Attorneys.

UNITED STATES PATENT OFFICE.

HARVEY FELDMEIER, OF LITTLE FALLS, NEW YORK, ASSIGNOR TO D. H. BURRELL & CO., OF SAME PLACE.

CENTRIFUGAL MILK-TESTER.

SPECIFICATION forming part of Letters Patent No. 647,180, dated April 10, 1900.

Application filed October 18, 1899. Serial No. 733,990. (No model.)

*To all whom it may concern:*

Be it known that I, HARVEY FELDMEIER, a citizen of the United States, residing at Little Falls, in the county of Herkimer, in the State of New York, have invented new and useful Improvements in Centrifugal Milk-Testers, of which the following is a specification.

This invention relates to that class of centrifugal milk-testing machines in which the rotary head carrying the bottle-holders is rotated by a gear mechanism which is actuated by hand.

The object of my invention is to so construct the casing in which the rotary head is arranged and the driving mechanism by which the rotary head is rotated that the casing and the driving mechanism are separate and distinct and can be easily assembled and separated.

Figure 1:
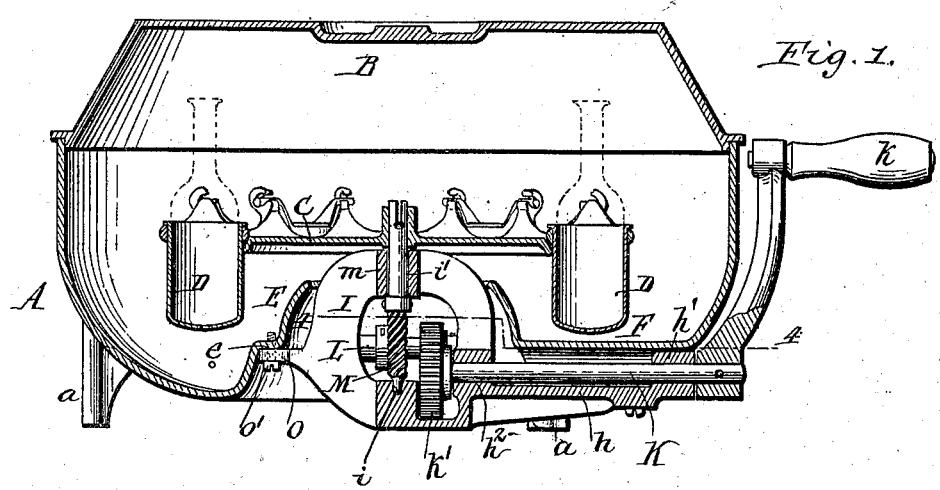
Figure 2:
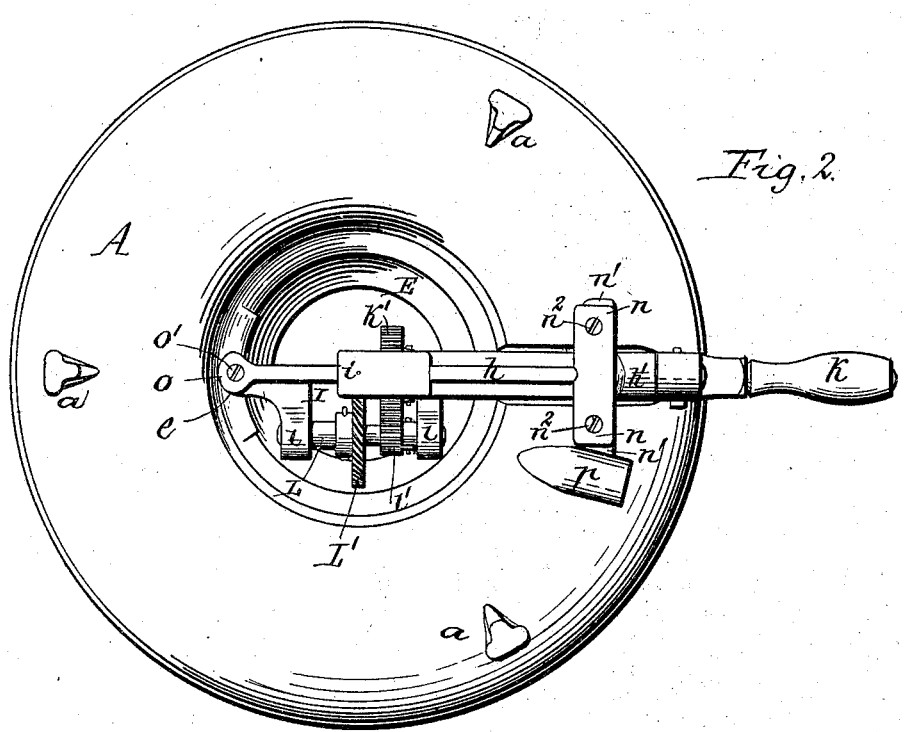
Figure 3:
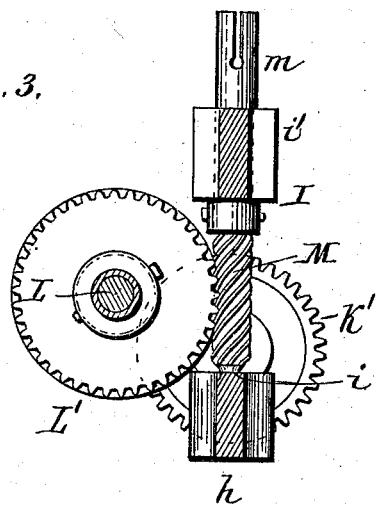
Figure 4:
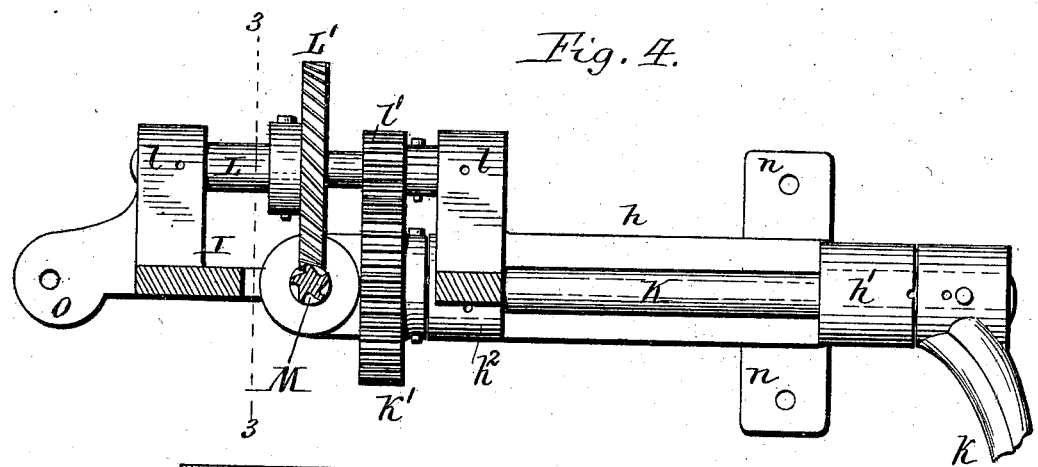
Figure 5:
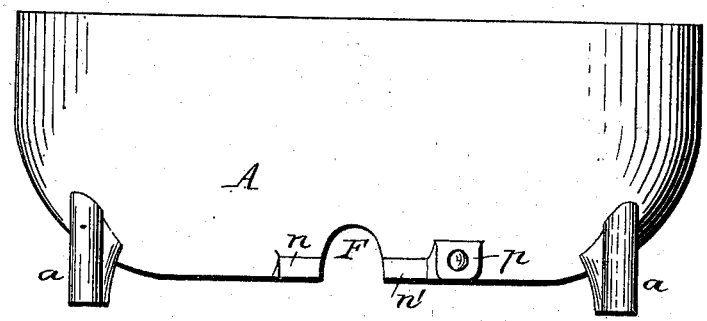

In the accompanying drawings, consisting of two sheets, Figure 1 is a vertical section of my improved milk-tester, the section being taken lengthwise of the driving mechanism. Fig. 2 is a bottom plan view of the same. Fig. 3 is a vertical section of the driving mechanism on an enlarged scale, the section being taken in line 3 3, Fig. 4. Fig. 4 is a top plan view of the same, partly in section, the section being taken in line 4 4, Fig. 1. Fig. 5 is an elevation of the lower part of the casing at right angles to Fig. 1.

Like letters of reference refer to like parts in the several figures.

A represents the lower part or body of the casing, having the form of a circular bowl rounded at the bottom and provided with supporting-feet $a$.

B represents the cover, which rests on and closes the casing and which may be of any suitable construction.

C is the rotary head, which is arranged horizontally within the casing and which carries the pivoted holders D, in which the test-bottles are placed, which are indicated by dotted lines in Fig. 1. This rotary head and the bottle-holders attached thereto may be of any suitable construction. The bottom of the casing is provided with a central upwardly-projecting or raised annular portion E. This annular raised central portion of the bottom is provided about midway of its height with a horizontal shoulder $e$. The bottom of the casing is provided with a raised, channeled, or arch-shaped portion F, which extends radially from the raised central portion E of the bottom to the outer side of the casing.

The frame which supports the driving mechanism is arranged underneath the bottom, partly within the raised central portion E and partly underneath the radial arch-shaped portion F thereof. This frame and the driving mechanism mounted thereon are constructed as follows:

$h$ represents a horizontal frame-bar, which is provided at its outer end with a raised bearing $h'$ and at its inner end with a similar raised bearing $h^2$.

I is a vertical open frame, which is formed at the inner end of the bar $h$ and which rises from the inner bearing $h^2$ and extends upwardly and inwardly therefrom. This vertical frame is provided in its lower portion with a step-bearing $i$ and in its upper portion with a corresponding bearing $i'$.

K is the horizontal driving-shaft, which is arranged lengthwise on the bar $h$ and journaled in the bearings $h'$ $h^2$ thereof. This shaft carries at its outer end a hand-crank $k$ and at its inner end, within the vertical frame I, a gear-wheel $k'$. The frame I is provided on one side with horizontally-projecting lugs $l$, in which is journaled a horizontal countershaft L, carrying a pinion $l'$ and a worm-wheel L'. This pinion meshes with the gear-wheel $k'$.

$m$ is the vertical spindle, which carries the rotary head C at its upper end. This spindle is journaled in the bearings $i$ $i'$ of the vertical frame I and is provided between said bearings with a worm or spiral gear M, with which the worm-wheel L' meshes. These gears are so proportioned that by rotating the hand-crank a rapid rotary movement is imparted to the spindle and the head, which is mounted thereon and which carries the bottle-holders.

The inner portion of the driving mechanism, comprising the vertical frame I, the counter-shaft, spindle, and gears are arranged within the open central raised portion E of the bottom of the casing. The upper portion of the frame I and of the spindle project upwardly through the central opening of this portion E of the bottom, and the spindle connects with the rotary head above the same. The horizontal bar $h$ of the frame is arranged underneath the radial raised or arch-shaped portion of the bottom. This raised, arch-shaped, or channeled portion of the bottom permits the driving-shaft to be located above the lowermost level of the bottom and reduces the height of the machine, rendering the same more compact, while allowing for a water-space of proper depth over the bottom.

The bar $h$ is provided near its outer end with laterally-projecting ears $n$, which fit against lugs $n'$, formed on the under side of the bottom, on opposite sides of the raised or channeled portion F thereof, to which lugs these ears are secured by screws $n^2$. The vertical frame I is provided at its inner end with an ear O, which fits against the under side of the shoulder $e$ of the raised central portion E of the bottom and is secured to said shoulder by a screw $O'$.

The driving mechanism is supported upon the frame comprising the bar $h$ and the vertical frame I and is entirely distinct and separate from the casing. This driving mechanism can be constructed in a machine-shop and the casing in a foundry, and the two parts are assembled by simply fastening the driving mechanism to the casing. If either part requires repairs, they are readily separated. For instance, if a casing should become cracked it can be readily replaced by a new one without requiring any work on the driving mechanism. This construction also renders the machine very compact and convenient for use.

$p$ represents an internally-threaded nipple for the attachment of a pipe through which hot water or steam can be conducted to the casing and the water can be drained off which falls on the bottom of the casing.

I claim as my invention—

1. In a centrifugal milk-tester, the combination with the casing having downwardly-projecting supports on which it rests and having its bottom constructed with a raised central portion, and the rotary head arranged in said casing, of a gear-supporting frame suspended from the under side of said casing and extending along the bottom thereof from the central portion to one side of the casing, and a driving mechanism mounted on said frame and comprising a horizontal driving-shaft provided at its outer end with means for rotating the same, a vertical spindle arranged at the inner end of said driving-shaft and connected at its upper end with said rotary head, and intermediate gearing connecting the inner end of said driving-shaft with said spindle, substantially as set forth.

2. In a centrifugal milk-tester, the combination with the casing having the bottom constructed with a raised central portion which is open at its top, and the rotary head arranged within said casing, of a gear-supporting frame suspended from the under side of said casing and composed of an inner raised portion which is arranged within said raised portion of the bottom and a horizontal portion extending from said raised portion outwardly to one side of the casing, a vertical spindle supported in the inner raised portion of the frame and extending through the open raised portion of the bottom to said rotary head, a horizontal driving-shaft supported in the horizontal portion of said frame, and intermediate gearing connecting said shaft with said spindle, substantially as set forth.

3. In a centrifugal milk-tester, the combination with the casing having its bottom constructed with a raised central portion, and the rotary head arranged within said casing, of a gear-supporting frame secured to the under side of said casing, and a driving mechanism comprising a horizontal driving-shaft, a horizontal counter-shaft, a vertical worm-spindle, and connecting gear-wheels, substantially as set forth.

4. In a centrifugal milk-tester, the combination with the casing having its bottom constructed with a raised central portion, and the rotary head arranged within said casing, of a gear-supporting frame which is secured to the under side of said casing and which comprises a radial bar and a vertical frame at the inner end of said bar, and a driving mechanism comprising a horizontal driving-shaft journaled on said bar, a horizontal counter-shaft and a vertical worm-spindle journaled on said vertical frame, and gear-wheels connecting said shaft and spindle, substantially as set forth.

5. A bowl-shaped casing for a centrifugal milk-tester having its bottom constructed with an open raised central portion and with an arched portion extending from said raised central portion to the outer side of the casing, substantially as set forth.

Witness my hand this 14th day of October, 1899.

HARVEY FELDMEIER.

Witnesses:
 G. W. BELLINGER,
 GRIFFITH PRICHARD.